United States Patent [19]
Heitman

[11] 3,834,407
[45] Sept. 10, 1974

[54] MILKING UNIT WASHER

[75] Inventor: Richard G. Heitman, Rhinebeck, N.Y.

[73] Assignee: The DeLaval Separator Company, Poughkeepsie, N.Y.

[22] Filed: May 14, 1973

[21] Appl. No.: 359,629

[52] U.S. Cl. .............................. 134/56 R, 134/171
[51] Int. Cl. ...................... B08b 9/00, B08b 11/02
[58] Field of Search .......... 134/56 R, 166 R, 166 C, 134/169 R, 169 C, 169 A, 171; 119/14.18

[56] References Cited
UNITED STATES PATENTS

| 1,579,796 | 4/1926 | Shiels | 134/169 R X |
| 1,946,400 | 2/1934 | Hapgood | 134/171 |
| 2,228,520 | 1/1941 | Hodsdon | 134/171 |
| 2,707,474 | 5/1955 | Wiginton | 134/166 R X |

FOREIGN PATENTS OR APPLICATIONS

| 964,735 | 5/1957 | Germany | 134/166 R |

Primary Examiner—Robert L. Bleutge
Attorney, Agent, or Firm—Cyrus S. Hapgood

[57] ABSTRACT

The teat cups are applied to outlets of a washer unit from which a cleaning liquid is sucked through the liners of the teat cups to a vacuum source. Upon removal of the teat cups from these outlets, a cover of the washer unit automatically descends from a washing position with a rotating movement to cover the outlets; and to prepare for the next washing operation, the cover is lifted and rotated to its washing position, where it is held by the teat cups when re-applied to the outlets.

4 Claims, 7 Drawing Figures

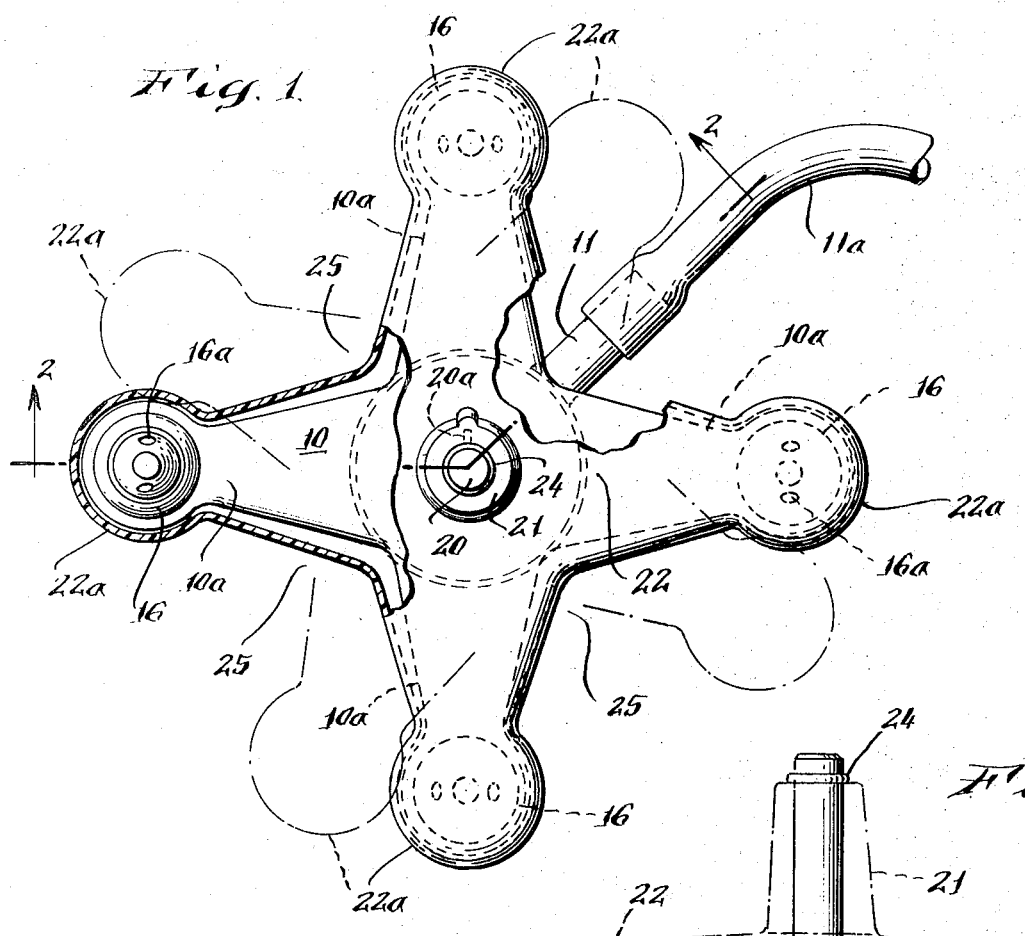
Fig. 1.
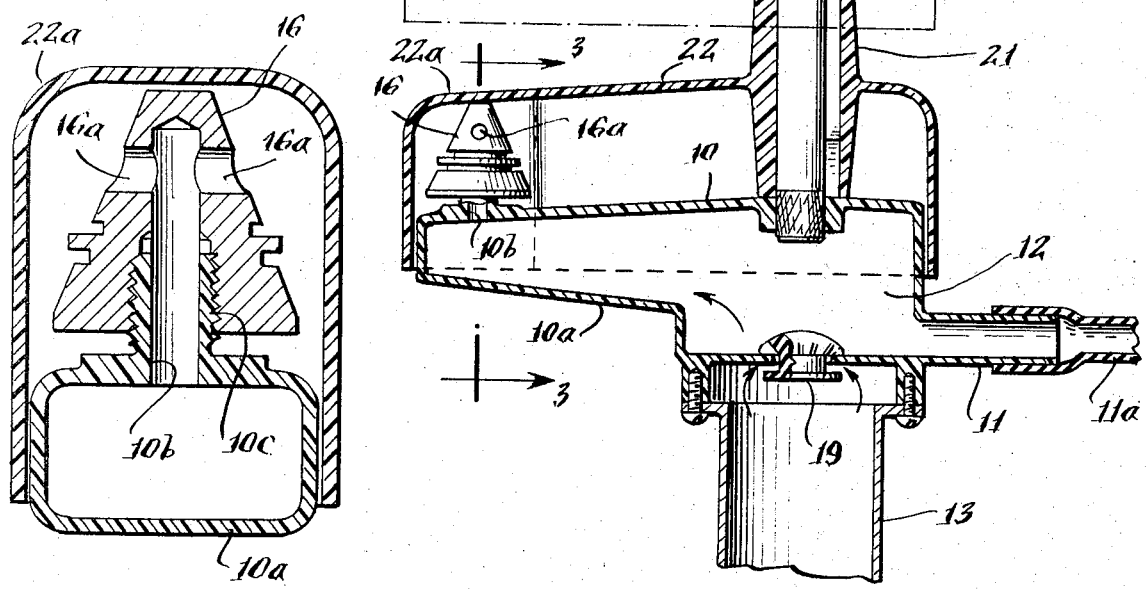
Fig. 2.
Fig. 3.

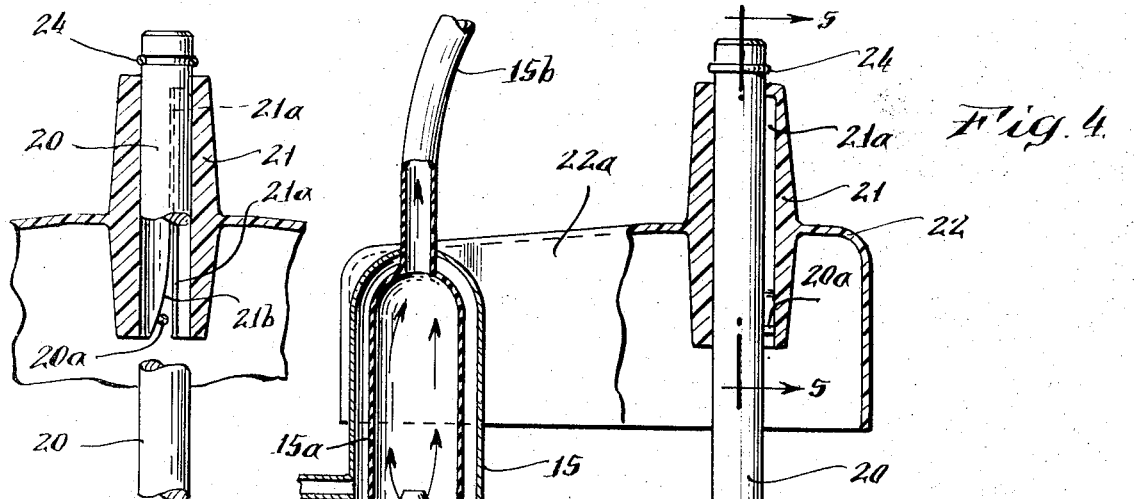
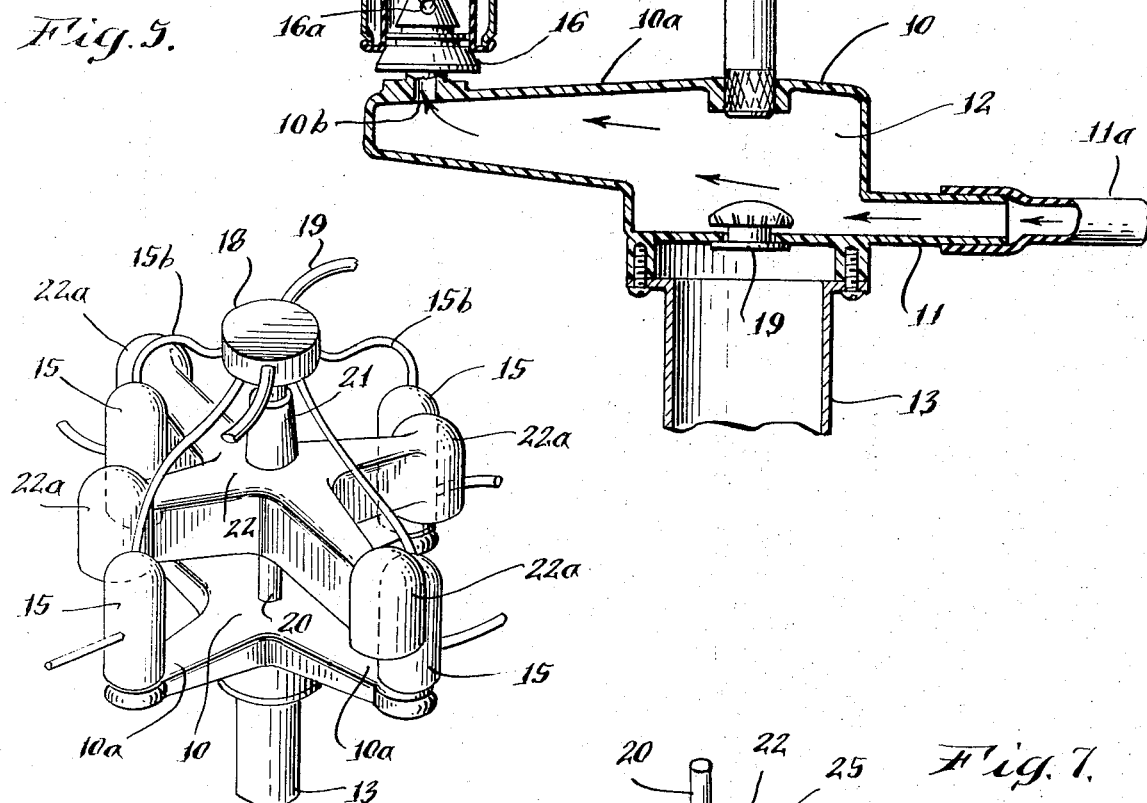
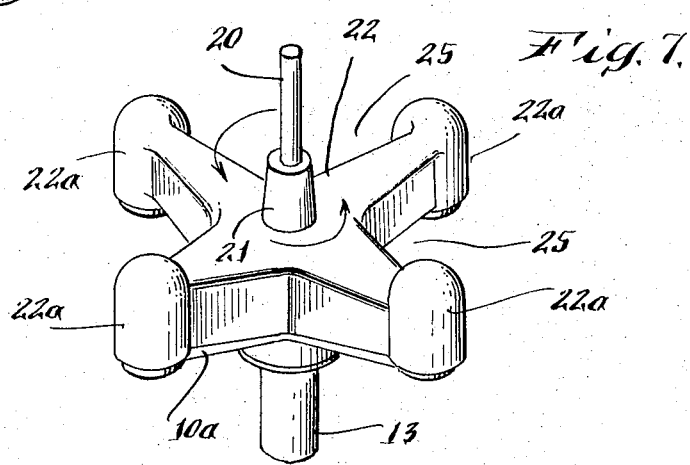

MILKING UNIT WASHER

THE DISCLOSURE

The present invention relates to washer units for milking machines and more particularly to an improved unit for washing the teat cups of such machines.

It is known in the art to provide vacuum milking apparatus with an arrangement for occasionally cleaning the apparatus by using the vacuum source to draw a cleaning liquid through the teat cups and other milk-contacting components of the apparatus. Such arrangements usually include a manifold having outlets for the cleaning liquid and to which the teat cups are applied in preparing for the washing operation, as disclosed in Recchia U.S. Pat. No. 2,794,420 dated June 4, 1957. However, these prior arrangements leave the manifold outlets completely exposed upon removal of the teat cups after a washing operation. This is objectionable because it allows the outlets to accumulate dust particles and other impurities which are picked up by the cleaning liquid during the next washing operation; and even when plugs are provided for covering the manifold outlets during the intervals between washing operations, the plugs must be applied by manual operations. Moreover, the dairyman cannot always be relied upon to effect these manual operations regularly.

The principal object of the present invention is to provide a washer unit for teat cups which automatically covers the manifold outlets upon removal of the teat cups after completion of a washing operation, and which is easily operable to uncover these outlets when the teat cups are to be re-applied to the manifold.

According to the invention, the washer unit comprises a cover having a closing position for covering the manifold outlets and movable to an open position to allow application of the teat cups to these outlets in preparation for a washing operation; and the cover is connected to the manifold by means operable to effect return of the cover from its open position to its closing position in response to removal of the teat cups from the manifold outlets.

In a preferred form of the invention, the cover is mounted for vertical and rotational movements relative to the manifold and includes elements radiating from its vertical rotation axis for covering the respective manifold outlets in the closing position of the cover. The gaps between these radial covering elements are positioned to overlie the respective manifold outlets when the cover is raised and rotated in one direction to its open position, so that the teat cups can be readily applied to the manifold outlets and are located in the gaps when so applied. The means for effecting return of the cover to its closing position preferably include a member which prevents downward movement of the cover from its open position as long as the cover is held against rotation, as when a teat cup is located in one of the gaps; but the teat cups cannot be removed from the manifold without also removing them from these gaps, whereupon the cover is free to rotate and descends by gravity while being rotated back to the position in which its radial covering elements overlie the respective outlets of the manifold.

For a better understanding of the invention, reference may be had to the following detailed description in conjunction with the accompanying drawings, in which:

FIG. 1 is a plan view illustrating a preferred form of the new washing unit;
FIG. 2 is a sectional view on line 2—2 of FIG. 1;
FIG. 3 is a sectional view on line 3—3 in FIG. 2;
FIG. 4 is a sectional view similar to FIG. 2 but showing a teat cup applied to a manifold outlet and holding the cover in its raised open position;
FIG. 5 is a sectional view on line 5—5 in FIG. 4;
FIG. 6 is a perspective view of the cover in its raised open position, with the teat cups applied to the manifold outlets, and
FIG. 7 is a view similar to FIG. 6 but showing the cover in its closing position after the teat cups have been removed from the manifold.

As illustrated, the new washing unit comprises a manifold 10 having a duct 11 forming an inlet for passage of washing liquid to the manifold chamber 12. The manifold 10 is mounted on a hollow member 13 secured to a fixed support (not shown), so that the manifold is located at a convenient region for washing the teat cups after a milking operation. The manifold has four hollow extensions 10a radiating horizontally from the center of the manifold. Each extension 10a is provided in its upper surface with an outlet 10b through which washing liquid can flow from the manifold chamber 12 through the liner of a teat cup applied to this outlet.

As shown in FIG. 4, each teat cup 15 is applied to a manifold outlet 10b by means of an upwardly tapered fitting 16. The latter is threaded on a hollow boss 10c (FIG. 3) forming the manifold outlet 10b. Each fitting 16 forms an upward extension of the corresponding outlet 10b, this extension having branches 16a opening through the tapered wall of the fitting near its upper end (FIG. 3). In applying each teat cup 15, it is inverted and forced down upon the fitting 16 so that the latter's tapered surface enters and is wedged in the usual liner 15a of the teat cup (FIG. 4).

To prepare for a washing operation, the four teat cups of the usual cluster are applied to the respective manifold outlets 10b in the manner shown in FIG. 4, and the manifold inlet 11 is connected through duct 11a to a source of cleaning liquid (not shown). Thus, when vacuum is applied to the milk tubes 15b of the respective teat cups, washing liquid is drawn from supply duct 11a into the manifold chamber 12 and thence through outlets 10b and through the teat cup liners 15a and tubes 15b.

As shown in FIG. 6, each milk tube 15b is connected through the usual claw 18 to a hose 19 leading to the vacuum source (not shown) of the milking system. This arrangement permits washing of the teat cups simultaneously with other milk-contacting parts of the milking system, as disclosed in the aforementioned Recchia patent. A valve 19 in the base of the manifold (FIGS. 2 and 4) is normally closed but opens automatically to admit air into chamber 12 when vacuum is applied for the washing operation, so that the air assists in flushing the washing liquid through the teat cups and their connections to the vacuum source.

A post 20 is fixed to the upper central part of manifold 10 and extends through a sleeve 21 integral with a movable cover 22. The latter is rotatable about post 20 as an axis and is guided by the post for vertical movements relative to the manifold. The cover has four elements 22a radiating from the rotation axis of the cover. Each element 22a forms a hollow closure open at the bottom and adapted to cover a corresponding manifold outlet fitting 16 when cover 22 is in a lower closing position, as shown in FIGS. 2 and 7. In this closing position of the cover 22, the lower end of its sleeve 21 rests upon the top of manifold 10; and each covering element 22a encloses the corresponding outlet fitting 16, with the side walls of the covering element located in closely adjacent relation to the side walls of the corresponding hollow extension 10a of the manifold.

The cover sleeve 21 has a close sliding fit on the post 20; and the sleeve bore has a groove 21a extending straight downward from the upper end portion of the bore, the lower part of the groove being curved laterally relative to its main part, as shown at 21b in FIG. 5. The post 20 has a detent 20a located in the groove 21a.

When a washing operation is to be effected, cover 22 is raised manually from its covering position shown in FIG. 7 and shown in full lines in FIG. 2. As the cover approaches its uppermost position, limited by a stop 24 on post 20, the latter's detent 20a enters the curved portion 21b of groove 21a, so that the cover is rotated in one direction about its axis (counterclockwise as shown by the arrows in FIG. 7). As a result, the radial cover elements 22a are displaced laterally from their original vertically aligned relation to the respective manifold extensions 10a. Thus, when the cover reaches its uppermost position (FIGS. 4 and 6), the manifold extensions 10a are located directly below corresponding gaps 25 formed between the radial cover elements 22a.

With the cover 22 held manually in this raised open position, a teat cup 15 is applied to a manifold outlet fitting 16 (FIG. 4), so that the fitting holds the teat cup in the overlying gap 25 of the cover. Thus, the teat cup engages an adjacent cover element 22a to prevent rotation of the cover in the opposite direction (clockwise in FIG. 7) when the cover is released. That is, without such engagement when the cover is released manually, it would descend by gravity while being rotated in this opposite direction by the camming action of detent 20a in the curved portion 21b of groove 21a.

When all four teat cups 15 have been applied to the corresponding manifold fittings 16 (FIG. 6), vacuum is applied to the hose 19 so as to draw cleaning liquid from duct 11a through the fittings 16 and teat cups 15, as previously described. During this washing operation, cover 22 is held in its raised open position (FIGS. 4 and 6) by the presence of the teat cups in the cover gaps 25.

After the washing operation has been completed and when the last teat cup 15 is removed from manifold 10, the cover 22 is free to rotate relative to the manifold. Thus, the cover automatically descends while being rotated by the above-mentioned camming action of detent 20a in the groove portion 21b, so as to realign the radial cover elements 22a vertically with corresponding manifold extensions 10a. Consequently, the cover automatically returns to its position for covering the manifold outlet fittings 16.

It will be apparent from the foregoing that cover 22 is operatively connected to manifold 10 by means including post 20 and the coacting surfaces represented by detent 20a and groove 21a–21b, and that such means operate automatically to effect return of the cover from its raised open position to its closing position in response to removal of the teat cups from the outlet fittings 16 of the manifold, thereby releasing the cover for rotational movement. In the absence of such rotational movement, the detent member 20a coacts with the curved groove portion 21b to hold the cover in its raised open position, as shown in FIG. 5.

I claim:

1. A washer unit for teat cups which comprises a manifold having an inlet for a cleaning liquid and having outlets adapted for application of respective teat cups to provide for flow of the cleaning liquid through the teat cups, a cover having a closing position for covering said outlets and movable to an open position to allow said application of the teat cups to said outlets, and means operatively connecting the cover to the manifold for automatically effecting return of the cover from said open position to said closing position in response to removal of the teat cups from the manifold outlets.

2. The washer unit of claim 1, in which said means include a post extending upwardly from the manifold for guiding the cover while it is raised to its open position, the cover being rotatable in one direction relative to the manifold to move the cover to said raised open position, said means also including a member operable to rotate the cover in the opposite direction during downward movement thereof to said closed position.

3. The washer unit of claim 2, in which the cover and post have substantially concentric coacting surfaces, said member being a detent on one of said surfaces, the other surface having a vertical groove receiving said detent and configurated to effect said rotational movement in said opposite direction.

4. The washer unit of claim 1, in which the cover has a vertical axis and elements radiating from said axis for covering the respective outlets in said closing position of the cover, the cover forming gaps between said elements, said means including a post on which the cover is movable to said open position by raising the cover while rotating it in one direction about said axis, thereby aligning said gaps vertically with the respective outlets to permit said application of the teat cups, said means also including a member operable to hold the cover in said raised open position upon engagement of a said element with a teat cup applied to one of said outlets and located in one of said gaps, said member being operable to permit downward movement of the cover by gravity while rotating the cover in the opposite direction in response to removal of the teat cups from said gaps, whereby the cover returns automatically to said closed position.

* * * * *